United States Patent [19]
Collin

[11] Patent Number: 6,164,658
[45] Date of Patent: Dec. 26, 2000

[54] HYDRAULIC SEAL

[75] Inventor: Derek M. Collin, Bristol, United Kingdom

[73] Assignee: Rolls-Royce plc, London, United Kingdom

[21] Appl. No.: 09/215,276

[22] Filed: Dec. 18, 1998

[30] Foreign Application Priority Data

Jan. 27, 1998 [GB] United Kingdom .................... 9801561

[51] Int. Cl.⁷ .................................................. F16J 15/447
[52] U.S. Cl. ............................ 277/418; 277/428; 277/917
[58] Field of Search .................................. 277/427, 429, 277/428, 917, 412, 418, 419

[56] References Cited

U.S. PATENT DOCUMENTS

| | | |
|---|---|---|
| 1,425,548 | 8/1922 | Schmidt . |
| 1,879,626 | 9/1932 | Mendenhall et al. .................... 277/427 |
| 3,455,561 | 7/1969 | Rinker et al. ............................ 277/427 |
| 3,531,131 | 9/1970 | Hummer ................................. 277/427 |
| 4,288,082 | 9/1981 | Setterberg, Jr. . |
| 4,498,291 | 2/1985 | Jeffery ......................................... 60/39 |
| 4,904,137 | 2/1990 | Matuschek .............................. 411/501 |
| 5,088,742 | 2/1992 | Catlow . |
| 5,239,750 | 8/1993 | Wright ................................... 29/888.3 |

FOREIGN PATENT DOCUMENTS

| | | |
|---|---|---|
| 1212593 | 11/1970 | United Kingdom . |
| 1284596 | 8/1972 | United Kingdom . |
| 2256682 | 12/1992 | United Kingdom . |

*Primary Examiner*—Anthony Knight
*Assistant Examiner*—Alison K. Pickard
*Attorney, Agent, or Firm*—W. Warren Taltavull; Farkas & Manelli PLLC

[57] ABSTRACT

A hydraulic seal (15) for providing a seal between two concentric shafts (10,12) of a gas turbine engine comprises a radially outer element (16) that defines an annular oil reservoir (21) and a radially inner element (22) having an annular fin (24) that projects into the oil reservoir (21). The radially inner seal element (22) is attached to its associated shaft (10) by frangible shear pins (26). In the event of relative axial movement between the shafts (10,12) the shear pins (26) break, thereby ensuring that such shaft relative axial movement is not unduly inhibited.

7 Claims, 1 Drawing Sheet

HYDRAULIC SEAL

FIELD OF THE INVENTION

This invention relates to a hydraulic seal and in particular to a hydraulic seal suitable for use in a gas turbine engine.

BACKGROUND OF THE INVENTION

It is common in gas turbine engines for there to be adjacent regions containing gases in which the gas in one region is at a higher pressure than that in the other region. Typically a seal is provided between the regions in order to ensure that the leakage of gas from the higher pressure region into the lower pressure region is minimised. The provision of such a seal between components that are relatively movable gives rise to increased difficulties. Although seals are known that rely on physical contact with both components, relative velocities of adjacent components in gas turbine engines can be such that seals of this type are subject to rapid wear.

An alternative seal design that has been employed in gas turbine engines where rapid relative rotary motion between components takes place is known as a hydraulic seal. Typically such a seal is defined between concentric shafts and is constituted by a radially inner component and a radially outer component. The radially outer component is attached to the radially outer shaft and is of annular U-shaped cross-section configuration; the open part of the U-shape being radially inward of the remainder thereof. The radially inner part is attached to the radially inner shaft and comprises at least one radially outwardly extending annular fin. The fin is of such a size that the major part of it locates, in non-contacting relationship, within the radially outer component.

In operation, when the radially outer seal component is rotating at a sufficiently high velocity, oil is directed into it. The oil is centrifugally retained within the radially outer component to define an annular oil reservoir into which the fin of the inner seal component extends. A gas seal is thereby defined. The oil flow rate is chosen such that at low rotational speeds during engine starting, there is sufficient oil present to ensure the operation of the gas seal. When normal engine operating speeds are reached, the oil flow rate is maintained at a level sufficient to ensure the continued satisfactory functioning of the seal and avoidance of the seal overheating.

Such hydraulic seals are very effective in preventing the flow of gas from a region of high gas pressure to a region of low gas pressure. However, they can give rise to problems if one of the shafts suffers a major failure and fractures.

The main shafts of a gas turbine engine interconnect the rotary air compression portions of the engine with its rotary turbine portions. Thus the rotary turbine portions drive the rotary air compression portions via the shafts. If one of the shafts should fracture, the load driven by its turbine portion is suddenly removed, thereby resulting in a rapid increase in its rotational speed. This increase is so rapid that if measures are not taken to slow it down, it will explode. Clearly such explosive turbine failure is not acceptable and so provisions are normally made to ensure that turbine braking takes place in the event of a shaft failure so that the critical explosive speed is not reached.

If a shaft fractures, its rearward part rapidly translates in a rearward direction until the rotor and stator parts of the turbine that it carries engage each other. The turbine is so designed that this results in a rapid slowing down of the turbine, thereby preventing its explosive failure. However, hydraulic seals of the type described above can have an adverse effect upon the effective operation of this mechanism. This is due to the fin and oil-containing parts of the seal engaging each other when the shaft moves rearward, thereby inhibiting further rearward shaft movement. As a result the turbine does not slow down to a speed sufficiently low to prevent its catastrophic failure.

SUMMARY OF THE INVENTION

It is an object of the present invention to provide a hydraulic seal that permits relative shaft movement to an extent sufficient to allow the various parts of the turbine to interact to provide rapid turbine braking following a shaft failure.

According to the present invention, a hydraulic seal for providing a seal between two concentric rotatable shafts of a gas turbine engine comprises a radially outer element for attachment to a radially outer shaft and a radially inner element for attachment to a radially inner shaft, said radially outer element being configured to define an annular, radially inwardly directed channel to operationally contain a hydraulic fluid and said radially inner element being configured to define at least one radially outwardly directed annular fin to operationally project into said hydraulic fluid, at least one of said seal elements being provided with frangible means for its attachment to its associated shaft to permit relative axial movement between said seal element and its associated shaft following breakage of said frangible means.

Said at least one seal element preferably comprises a sleeve that is located upon one of said radially inner and outer shafts in such a manner that relative movement is permitted therebetween following breakage of said frangible means.

A lubricant is preferably provided between said at least one seal element sleeve and its associated shaft to facilitate said relative movement.

Said radially inner seal element is preferably attached to said radially inner shaft by said frangible means.

Said frangible means may comprise at least one shear pin interconnecting one of said seal elements and its associated shaft.

Said at least one shear pin may be so configured and positioned as to break by failing in shear.

By failing in this manner, the hydraulic seal does not seriously inhibit turbine braking following a shaft failure and resultant relative axial movement of the shafts.

BRIEF DESCRIPTION OF THE DRAWINGS

The present invention will now be described, by way of example, with reference to the accompanying drawings in which.

DETAILED DESCRIPTION OF THE INVENTION

Figure 1:
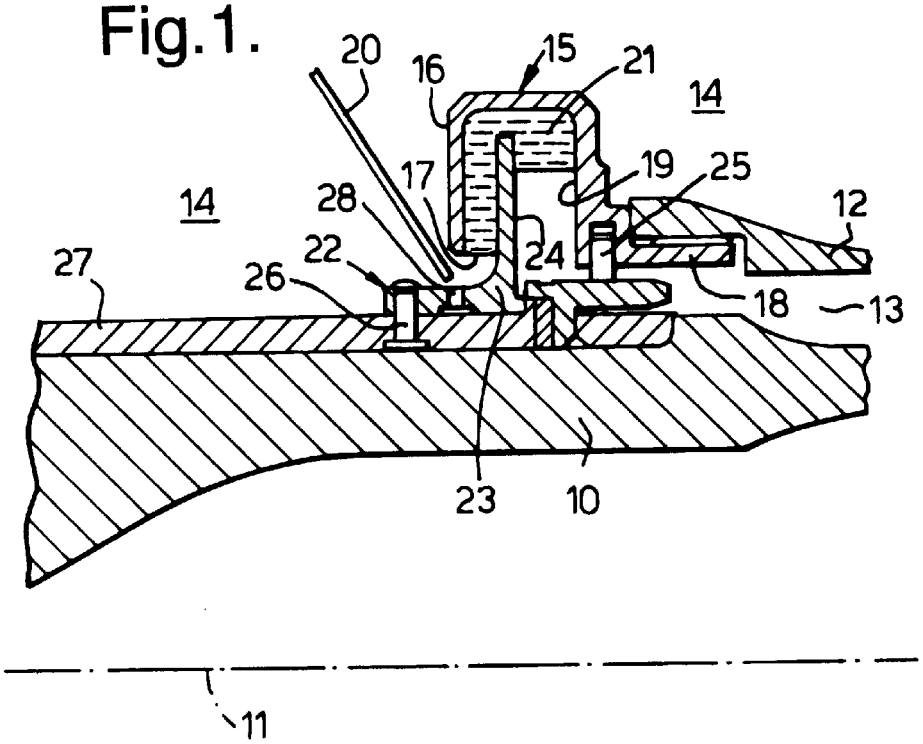
FIG. 1 is a sectioned side view of a hydraulic seal in accordance with the present invention.

Referring to FIG. 1, there is shown part of the low pressure shaft 10 of a gas turbine engine (not shown). The low pressure shaft 10 is of annular cross-sectional configuration and rotates about an axis 11 that is concentric with the longitudinal axis of the gas turbine engine. An annular cross-section configuration high pressure shaft 12 is located radially outwardly of the low pressure shaft 10 and is also coaxial with the axis 11.

The low and high pressure shafts 10 and 12 are of generally conventional configuration and will not therefore be described in detail since such details are well known to those skilled in the art. Generally, each shaft 10 -and 12 drivingly interconnects a compressor and a turbine: the low pressure shaft 10 interconnects a low pressure compressor and a low pressure turbine, and the high pressure shaft 12 interconnects a high pressure compressor and a high pressure turbine.

The low and high pressure shafts 10 and 12 are radially separated so that a region 13 is defined between them. The region 13 contains air, for cooling purposes, that is at a pressure higher than that of air in the region 14 adjacent thereto. The air is at a higher pressure in order that it may perform certain engine component cooling functions as is well known in the art.

In the interests of overall engine operating efficiency, it is important to ensure that the high and low pressure regions of air 13 and 14 are separated from each other. This is achieved by the provision of a hydraulic seal 15 between those regions 13 and 14. The hydraulic seal 15 comprises an annular radially outer element 16 of U-shaped cross-sectional shape. One side of the outer element 16 is provided with an annular, axially extending flange 18 which is externally threaded to facilitate its attachment to one end of the high pressure shaft 12 which is correspondingly threaded. It will be appreciated, however, that alternative means of attachment, such as bolts, could be employed if so desired. Indeed, it may be appropriate in certain cases for the shaft 12 and outer element 16 to be an integral structure.

The open side 17 of the outer element 16 is radially inwardly facing so that operationally it defines an open channel 19. When, during engine operation, the high pressure shaft 12 is rotating during engine operation, a continuous supply of oil is directed through a supply pipe 20 into the channel 19 to create and maintain an annular reservoir of oil 21. The rotational speed of the outer shaft 12 is such that the oil is centrifugally maintained in place within the outer element 16.

The hydraulic seal 15 additionally comprises a radially inner element 22 that is attached to the radially inner low pressure shaft 10. The inner element 22 comprises a sleeve 23 which locates around the low pressure shaft 10 and an annular fin 24 that is integral with and extends radially outwardly from the sleeve 23. The fin 24 is of such radial extent that it extends into the outer seal element 16 to be partially immersed in the oil reservoir 21. As can be seen in FIG. 1, the pressure differential between the regions 13 and 14 results in the oil levels on the two sides of the fin 24 being different.

It will be seen therefore that the fin 24, the outer seal element 16 and the oil reservoir 21 co-operate to provide a gas barrier between the high and low pressure regions 13 and 14. A seal 25 of the piston ring type is provided between the outer seal element 16 and a portion of the low pressure shaft 10. The seal 25 opens up during normal engine operation and so, under these conditions, does not function as a seal. However, when the engine is run down prior to being turned off, the seal 25 serves to prevent oil splashing into the high pressure region 13.

As stated previously, each of the low pressure shaft 10 and the high pressure shaft 12 interconnects a compressor and a turbine. If either of those shafts 10 and 12 should fracture, the rearward portion of the failed shaft will move very rapidly in a rearward direction. In FIG. 1 that direction would be from the left to the right of the drawing. If a gas turbine engine suffers a shaft failure of this nature during normal operation, the rotational speed of the turbine attached to that shaft will increase rapidly over a very short time period. Indeed, the rotational speed will increase to such a level that the turbine will break up as a result of the increased centrifugal loads imposed upon it. It is common practice to ensure that this does not happen by designing the turbine in such a way that its various rotational and nonrotational parts interact with each other to provide rapid braking. However, this mechanism could be prevented from working effectively by engagement of the inner seal element 16 with the outer seal element 22, inhibiting shaft axial movement.

In order to ensure that the turbine overspeed protection mechanism described above is permitted to function in the desired manner, the hydraulic seal 15 is modified. That modification ensures that in the event of a shaft failure that could result in its associated turbine overspeeding, the seal 15 does not significantly impede axial shaft movement. More specifically, the sleeve 23 of the inner element 22 is a sliding fit upon the shaft 10. However, relative sliding movement between the sleeve 23 and shaft 10 is normally prevented by a series of shear pins, one of which can be seen at 26, that interconnect the sleeve 23 and shaft 10. Each shear pin 26 is frangible and locates in appropriately dimensioned apertures provided in the sleeve 23 and the shaft 10.

In order to accommodate the shear pins 26, the shaft 10 is provided with a sleeve 27 that is fixed in position on the shaft 10 by means not shown. The shear pin receiving apertures in the shaft sleeve 27 are so positioned as to be aligned with the apertures in the seal sleeve 23.

In the event of a shaft failure that results in relative axial movement between the shafts 10 and 12, the fin 24 contacts the outer seal element 16. This, in turn, results in shear loads being imposed upon the shear pins 26. The shear pins 26 are arranged to be sufficiently frangible that under these conditions they fail, thereby allowing the seal sleeve 23, and hence the inner seal element 22, to translate along the shaft sleeve 27. Apertures 28 in the seal sleeve 28 ensure that oil from the supply pipe 20 has access to the interface between the seal sleeve 23 and the shaft sleeve 27 to facilitate that translation. Alternatively, other means, such as the provision of suitable dry film lubricant, could be employed to facilitate such translation.

Figure 2:
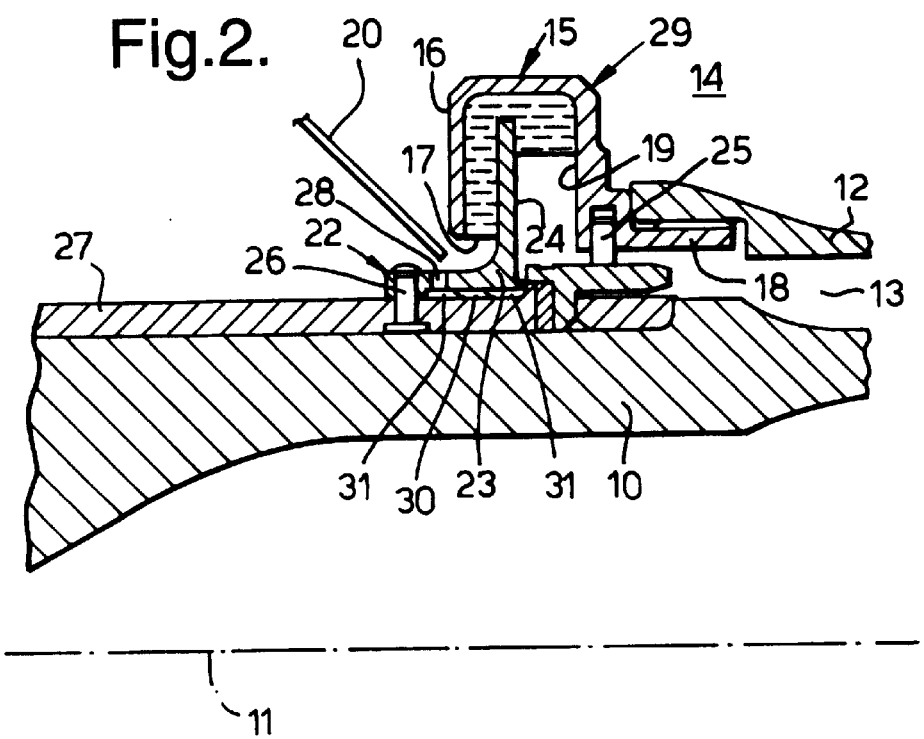
FIG. 2 is a sectioned side view of a further embodiment of a hydraulic seal in accordance with the present invention.

In an alternative embodiment of the present invention shown in FIG. 2, components corresponding to those in FIG. 1 are designated with the same reference numbers.

The major difference between the hydraulic seal 29 shown in FIG. 2 and the hydraulic seal 15 shown in FIG. 1 resides in the manner in which the sleeve 23 of the radially inner element 22 fits upon the shaft sleeve 27. In the case of the seal 29, the inner surface of its sleeve is provided with radially inwardly directed helical splines 30 that interact with corresponding radially outwardly directed splines 31 provided on the radially outer surface of the shaft sleeve 27. The helical angle of the splines 30 and 31 is arranged so that in the event of a shaft failure and consequent contact between the seal elements 16 and 22, a positive torque drive is applied to the inner seal element 22 to assist in the shearing of the shear pins 22. Oil supplied through the aperture 28 ensures that the splines 30 and 31 are adequately lubricated and maintained free of debris which could inhibit their effective operation.

Although the present invention has been described with reference to hydraulic seals 15 and 29 in which their radially inner elements 22 are attached to the shaft 10 by frangible shear pins 26, it will appreciated that alternative arrangements could be utilised if desired. Thus, for instance, alternatively or additionally, the outer seal element 16 could be attached by frangible means to the radially outer shaft 12. Moreover, frangible means other than shear pins could be employed if so desired.

I claim:

1. A hydraulic seal for providing a seal between two concentric rotatable shafts of a gas turbine engine comprising a radially outer element for attachment to a radially outer shaft and a radially inner element for attachment to a radially inner shaft, said radially outer element being configured to define an annular, radially inwardly directed channel to operationally contain a hydraulic fluid and said radially inner element being configured to define at least one radially outwardly directed annular fin to operationally project into said hydraulic fluid, at least one of said outer and inner elements being provided with frangible means for its attachment to its associated shaft to permit relative axial movement between said at least one outer and inner element and its associated shaft following breakage of said frangible means, said channel and said fin being so located that in the event of breakage of one of said shafts, relative movement between said channel and said fin will occur to cause breaking of said frangible means thereby allowing movement of said shafts.

2. A hydraulic seal as claimed in claim 1 wherein said at least one outer and inner element comprises a sleeve that is located upon one of said radially inner and outer shafts in such a manner that relative movement is permitted therebetween following breakage of said frangible means.

3. A hydraulic seal as claimed in claim 2 wherein a lubricant is provided between said at least one outer and inner element sleeve and its associated shaft to facilitate said relative movement.

4. A hydraulic seal as claimed in claim 1 wherein said radially inner element is attached to said radially inner shaft by said frangible means.

5. A hydraulic seal as claimed in claim 1 wherein said frangible means comprises at least one shear pin interconnecting said at least one outer and inner element and its associated shaft.

6. A hydraulic seal as claimed in claim 5 wherein said at least one shear pin is so configured and positioned as to break by failing in shear.

7. A hydraulic seal as claimed in claim 1 wherein said hydraulic fluid is a lubricating oil.

* * * * *